US012664226B2

(12) United States Patent
Kern et al.

(10) Patent No.: US 12,664,226 B2
(45) Date of Patent: Jun. 23, 2026

(54) SELF-DIAGNOSING LINK STABILIZER

(71) Applicant: The Travelers Indemnity Company, Hartford, CT (US)

(72) Inventors: Jeffrey Kern, West Hartford, CT (US); Brian H. Hoscheit, Philadelphia, PA (US); Ernesto Leyva Barrero, Orlando, FL (US); Sudharsanan Alisoor Narasimharaghavan, Sunbury, OH (US); Ruth A. Murphy, Minneapolis, MN (US); Stephen C. Osborn, Rocky River, OH (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 0 days.

(21) Appl. No.: 18/374,069

(22) Filed: Sep. 28, 2023

(65) Prior Publication Data

US 2025/0111001 A1 Apr. 3, 2025

(51) Int. Cl.
*G06F 16/955* (2019.01)
*G06F 16/957* (2019.01)
*H04L 9/40* (2022.01)

(52) U.S. Cl.
CPC ........ *G06F 16/9566* (2019.01); *G06F 16/957* (2019.01); *H04L 63/101* (2013.01)

(58) Field of Classification Search
CPC ........................... G06F 16/9556; H04L 63/101
See application file for complete search history.

(56) References Cited

U.S. PATENT DOCUMENTS

| | | | | |
|---|---|---|---|---|
| 6,185,598 B1 * | 2/2001 | Farber | ................. | H04L 67/1036 |
| | | | | 709/200 |
| 6,449,615 B1 * | 9/2002 | Liu | ........................ | G06F 16/958 |
| | | | | 709/200 |
| 7,761,500 B1 * | 7/2010 | Eckert | ................... | H04L 67/563 |
| | | | | 709/239 |
| 7,945,693 B2 * | 5/2011 | Farber | ................... | H04L 67/564 |
| | | | | 709/224 |
| 7,949,779 B2 * | 5/2011 | Farber | ....................... | H04L 9/40 |
| | | | | 709/224 |
| 8,776,209 B1 * | 7/2014 | Kumar | ................ | H04L 63/0815 |
| | | | | 709/225 |
| 10,290,022 B1 * | 5/2019 | Canavor | ........... | G06Q 30/0269 |

(Continued)

OTHER PUBLICATIONS

Fielding et al., "Hypertext Transfer Protocol—HTTP/1.1", Jun. 1999, https://datatracker.ietf.org/doc/html/rfc2616.*

*Primary Examiner* — Douglas B Blair
(74) *Attorney, Agent, or Firm* — CANTOR COLBURN LLP

(57) ABSTRACT

A system includes a plurality of memory resources and a plurality of processor resources configured to access the memory resources and execute a plurality of instructions to perform a plurality of operations. The operations generate an alias link through a web service, the alias link defining a first target link to a first target resource through a network, and insert the alias link within a network accessible resource. The operations further provide access to the first target resource through the alias link from within the network accessible resource and maintain the alias link in an unchanged state after the web service changes the alias link to define a second target link to a second target resource through the network.

23 Claims, 15 Drawing Sheets

1300

1302
Generate an alias link through a web service, the alias link defining a first target link to a first target resource through a network 1304
Insert the alias link within a network accessible resource 1306
Provide access to the first target resource through the alias link from within the network accessible resource 1308
Maintain the alias link in an unchanged state after the web service changes the alias link to define a second target link to a second target resource through the network

1400

1402
Monitor a plurality of aliases to determine whether each associated target resource returns a response code that matches an expected code in response to a request 1404
Based on determining that a redirect response code is returned as the response code, perform a health check to follow the redirect and determine whether the expected code is returned 1406
Send a notification to one or more creators and group maintainers based on detecting one or more health conditions in response to the health check to prompt an update of an associated alias link

(56) References Cited

U.S. PATENT DOCUMENTS

| | | | | |
|---|---|---|---|---|
| 11,134,117 | B1* | 9/2021 | Farhangi | G06F 16/95 |
| 11,570,230 | B1* | 1/2023 | Shaw | H04L 67/561 |
| 2002/0159601 | A1* | 10/2002 | Bushmitch | H04L 63/0435 |
| | | | | 713/168 |
| 2004/0088332 | A1* | 5/2004 | Lee | G06F 16/93 |
| 2007/0180019 | A1* | 8/2007 | Woods | G06F 16/954 |
| | | | | 707/E17.111 |
| 2007/0283273 | A1* | 12/2007 | Woods | G06F 16/95 |
| | | | | 715/738 |
| 2009/0018913 | A1* | 1/2009 | Sarukkai | H04M 3/53383 |
| | | | | 705/14.56 |
| 2009/0070873 | A1* | 3/2009 | McAfee | G06F 21/56 |
| | | | | 726/22 |
| 2009/0201532 | A1* | 8/2009 | Pesar | G06F 16/9566 |
| | | | | 358/1.15 |
| 2009/0300103 | A1* | 12/2009 | Matsutsuka | H04L 67/02 |
| | | | | 709/203 |
| 2011/0066710 | A1* | 3/2011 | Paul | G06F 16/958 |
| | | | | 709/222 |
| 2011/0113317 | A1* | 5/2011 | Ramaswamy | H04L 61/4555 |
| | | | | 715/205 |
| 2011/0264992 | A1* | 10/2011 | Vishria | G06F 16/9566 |
| | | | | 715/208 |
| 2012/0030359 | A1* | 2/2012 | Piernot | G06F 16/9566 |
| | | | | 709/226 |
| 2012/0210243 | A1* | 8/2012 | Uhma | G06F 9/45529 |
| | | | | 715/744 |
| 2013/0167118 | A1* | 6/2013 | Borgianni | G06F 16/955 |
| | | | | 717/121 |
| 2013/0238470 | A1* | 9/2013 | Takahashi | G06F 16/9566 |
| | | | | 715/780 |
| 2015/0074816 | A1* | 3/2015 | Son | H04W 12/12 |
| | | | | 726/26 |
| 2017/0076007 | A1* | 3/2017 | Knoll | G06Q 30/0255 |
| 2018/0018115 | A1* | 1/2018 | Ikegame | G06F 3/0619 |
| 2018/0309720 | A1* | 10/2018 | Cochran | H04L 61/3025 |
| 2020/0104327 | A1* | 4/2020 | Heer, III | G06F 40/134 |
| 2020/0162423 | A1* | 5/2020 | Zhu | H04L 61/2596 |
| 2020/0358798 | A1* | 11/2020 | Maylor | H04L 63/1433 |
| 2021/0226987 | A1* | 7/2021 | Summers | H04L 63/1441 |
| 2022/0012299 | A1* | 1/2022 | Wittke | G06F 16/9558 |
| 2022/0141667 | A1* | 5/2022 | Lee | H04L 51/063 |
| | | | | 726/24 |
| 2022/0263818 | A1* | 8/2022 | Corella | H04L 9/3231 |
| 2023/0208876 | A1* | 6/2023 | Jung | H04L 63/1441 |
| | | | | 726/23 |

* cited by examiner

Figure 3:
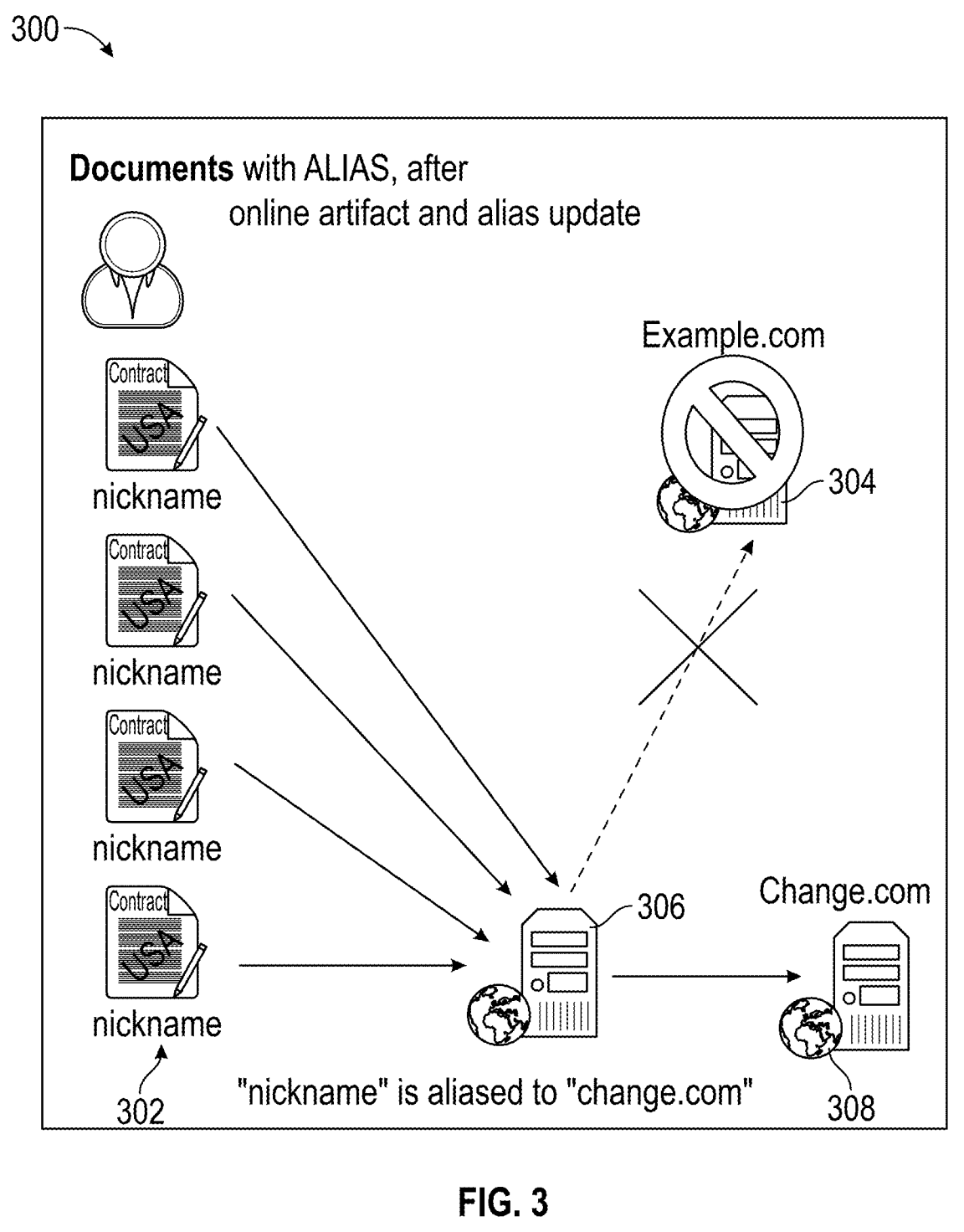

300

Documents with ALIAS, after
       online artifact and alias update

Example.com nickname nickname nickname

304

306

Change.com nickname

302

"nickname" is aliased to "change.com"     308

[ADD / EDIT] LINK

902

Target*

Description*

Customize Alias* NO [×] YES [ ]    Alias: [                    ]

Group * [ Team1 ] ×

Select a new group:

[ Team2 ]

906

Tags [ ProdSupport ] × [ HR ] ×

Add available tags:

[ Sales ]    [ Marketing ]

904

[ OK ]    [ CANCEL ]

1000

1100

1200

LinkKit

1202

1208

BULK IMPORT > FILE UPLOAD    09/29/2023

Upload a CSV file that adheres to the following format, one entry per line TargetURL, Description, Group, Tags:Tags, [AliasName*]
Separate groups and tags with a colon. Alias name is optional.

Filename [                    ] Browse

1204

OK

ReLink
- Dashboard
- Links
- Bulk Import
  - Text Box
  - File Upload
- Analytics

Profile
- Sign Out

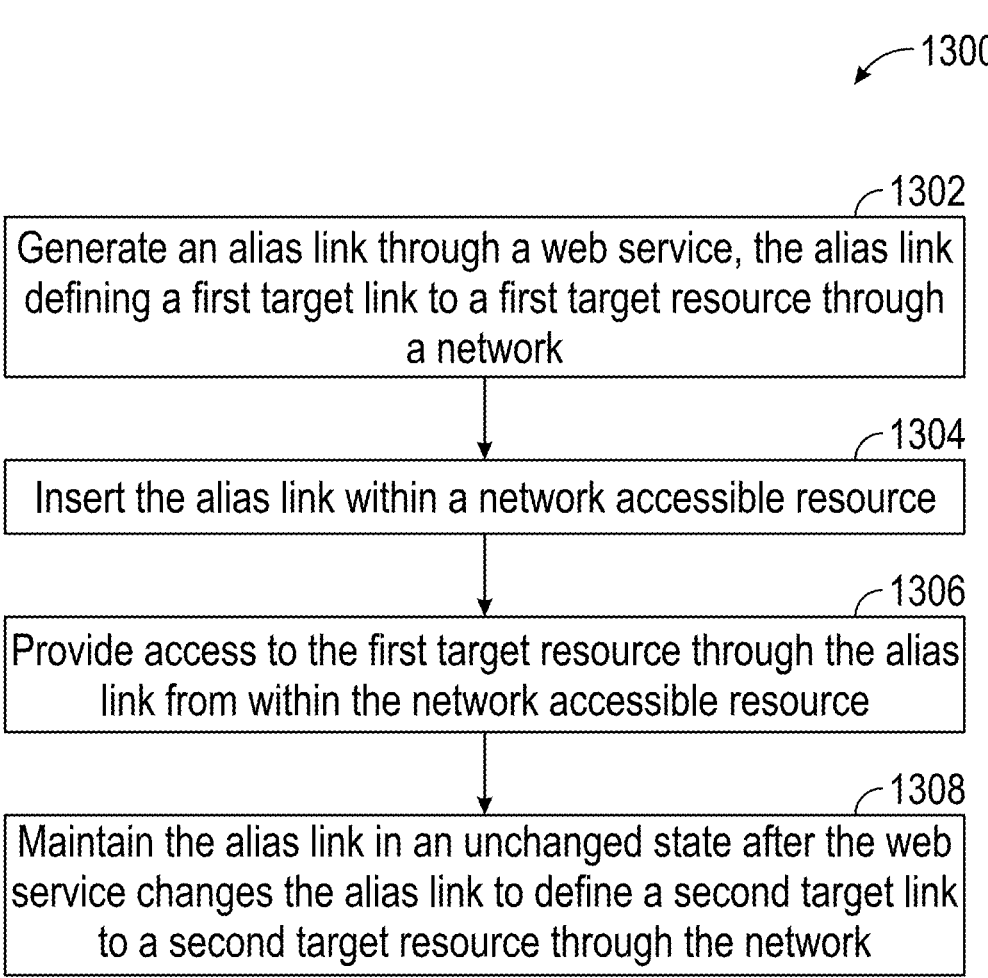

1300

1302

Generate an alias link through a web service, the alias link defining a first target link to a first target resource through a network

1304

Insert the alias link within a network accessible resource

1306

Provide access to the first target resource through the alias link from within the network accessible resource

1308

Maintain the alias link in an unchanged state after the web service changes the alias link to define a second target link to a second target resource through the network

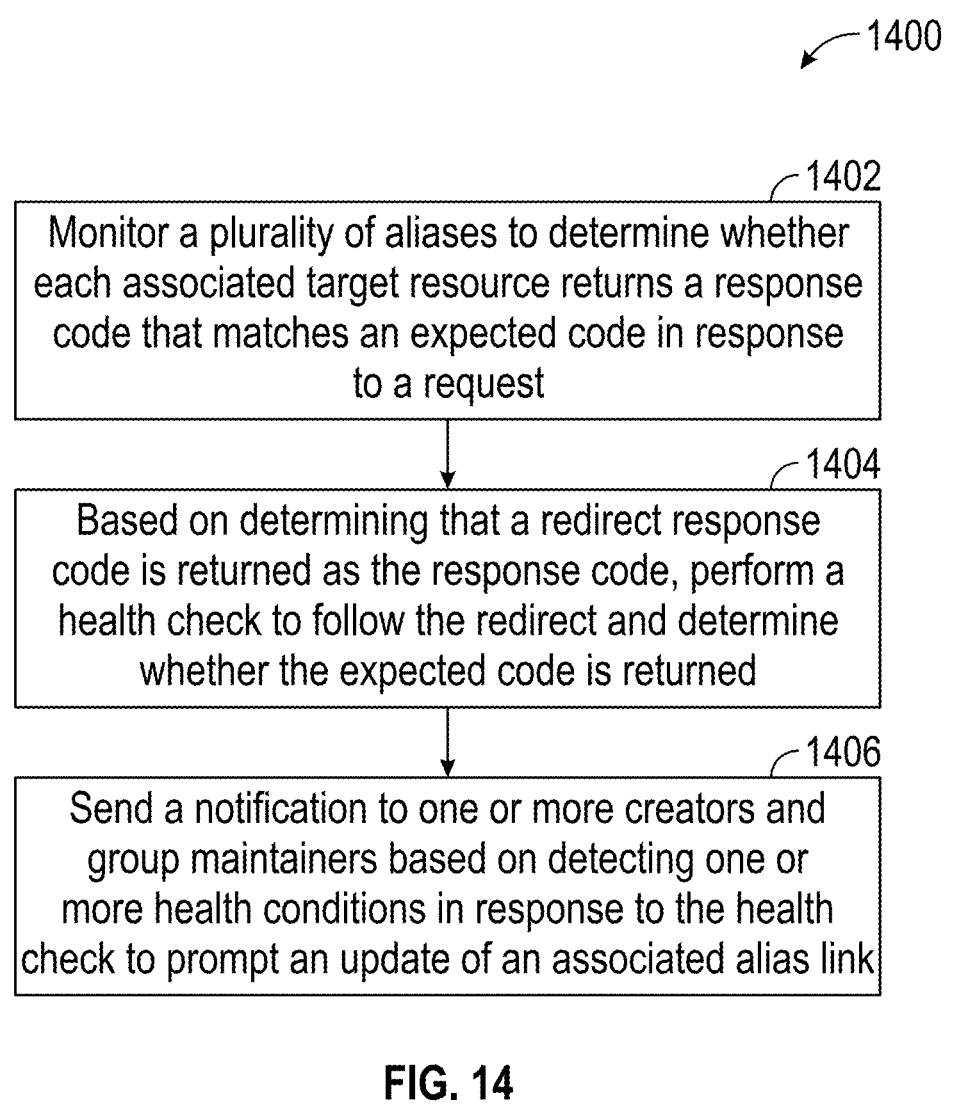

┌─────────────────────────────────────────┐ ―1402
│ Monitor a plurality of aliases to determine whether │
│ each associated target resource returns a response │
│ code that matches an expected code in response │
│ to a request │
└─────────────────────────────────────────┘
                      │
                      ▼
┌─────────────────────────────────────────┐ ―1404
│ Based on determining that a redirect response │
│ code is returned as the response code, perform a │
│ health check to follow the redirect and determine │
│ whether the expected code is returned │
└─────────────────────────────────────────┘
                      │
                      ▼
┌─────────────────────────────────────────┐ ―1406
│ Send a notification to one or more creators and │
│ group maintainers based on detecting one or │
│ more health conditions in response to the health │
│ check to prompt an update of an associated alias link │
└─────────────────────────────────────────┘

FIG. 14

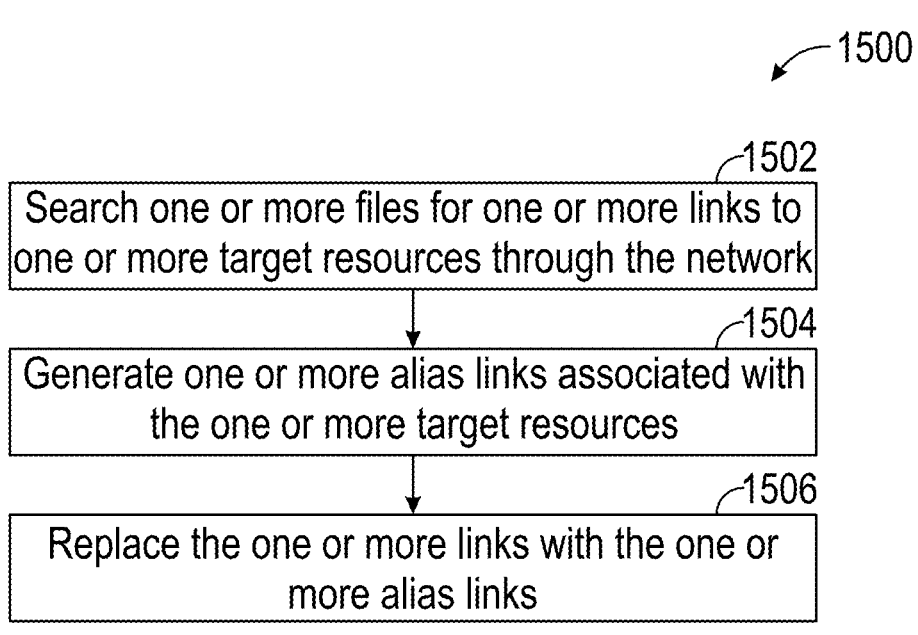

┌1500

┌1502
Search one or more files for one or more links to one or more target resources through the network ┌1504
Generate one or more alias links associated with the one or more target resources ┌1506
Replace the one or more links with the one or more alias links

FIG. 15

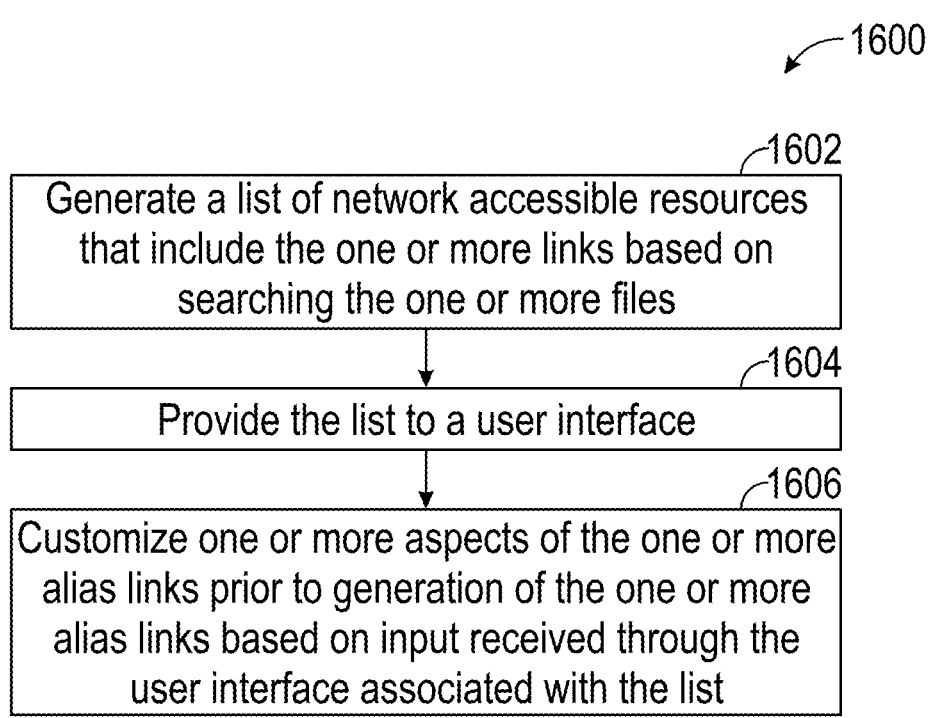

┌1600

┌1602
Generate a list of network accessible resources that include the one or more links based on searching the one or more files ┌1604
Provide the list to a user interface ┌1606
Customize one or more aspects of the one or more alias links prior to generation of the one or more alias links based on input received through the user interface associated with the list

FIG. 16

SELF-DIAGNOSING LINK STABILIZER

BACKGROUND

Linked resources can be a convenient way to provide access to users upon link selection through computer systems. Links can avoid making redundant copies of information in contrast to embedding content in documents, spreadsheets, presentations, messages, web pages, and other such electronic content. However, broken links can occur when the linked content is moved to another server, folder, or network address. Further, links can point to stale content, where the old content still exists, but a newer version of the content also exists at a different network address. When linked content is widely distributed, it can be challenging to manage and maintain the links accurately over a period of time.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

FIG. 3 depicts an example of link aliasing for embedded link management according to some embodiments of the present invention;

FIG. 13 depicts an alias link management process according to some embodiments of the present invention;

FIG. 14 depicts an alias health check process according to some embodiments of the present invention;

FIG. 15 depicts an alias link insertion process according to some embodiments of the present invention; and FIG. 16 depicts a batch processing process according to some embodiments of the present invention.

DETAILED DESCRIPTION

According to an embodiment, a system for alias link creation, usage, and management is provided. The system may be used for various practical applications of inserting alias links into electronic content to reach one or more target resources through a computer network. As used herein, an "alias link" can include a computer-readable electronic link to an intermediate location which provides a secondary link to one or more target resources through a computer network. The alias link provides a stable access point for multiple sources to access a current address of the one or more target resources. As such, when a network location or name of the one or more target resources changes, only the mapping provided through an alias link service needs to be updated rather than copies of static links embedded in various locations. According to embodiments, a web service can provide one or more methods to create, read, update, delete, generate, maintain, monitor, and publish alias links that utilize link addresses, such as hypertext transfer protocol (HTTP) uniform resource locators (URLs), as a target resource to reference and access a specific online artifact. The alias links can be embedded as links in documents, software, and/or systems such that users and systems can reference and access the online artifacts via the target resource (e.g., open/read a file through a network). When a link address (e.g., the HTTP URL) for an online artifact changes, a publisher can update the target resource address pointed to by an alias link to the updated address (e.g., a new HTTP URL). Various documents, software, and/or systems that embed the alias link automatically point to the updated target resource without needing to directly modify the documents, software, and/or systems.

Examples of network resources that can include embedded links are documents, spreadsheets, presentations, portable document format files, web pages, and the like. Software and systems that can include embedded links can include, for instance, file/directory systems, applications, and/or any HTTP-enabled piece of technology that establishes a connection to another HTTP-enabled piece of technology.

Figure 1:
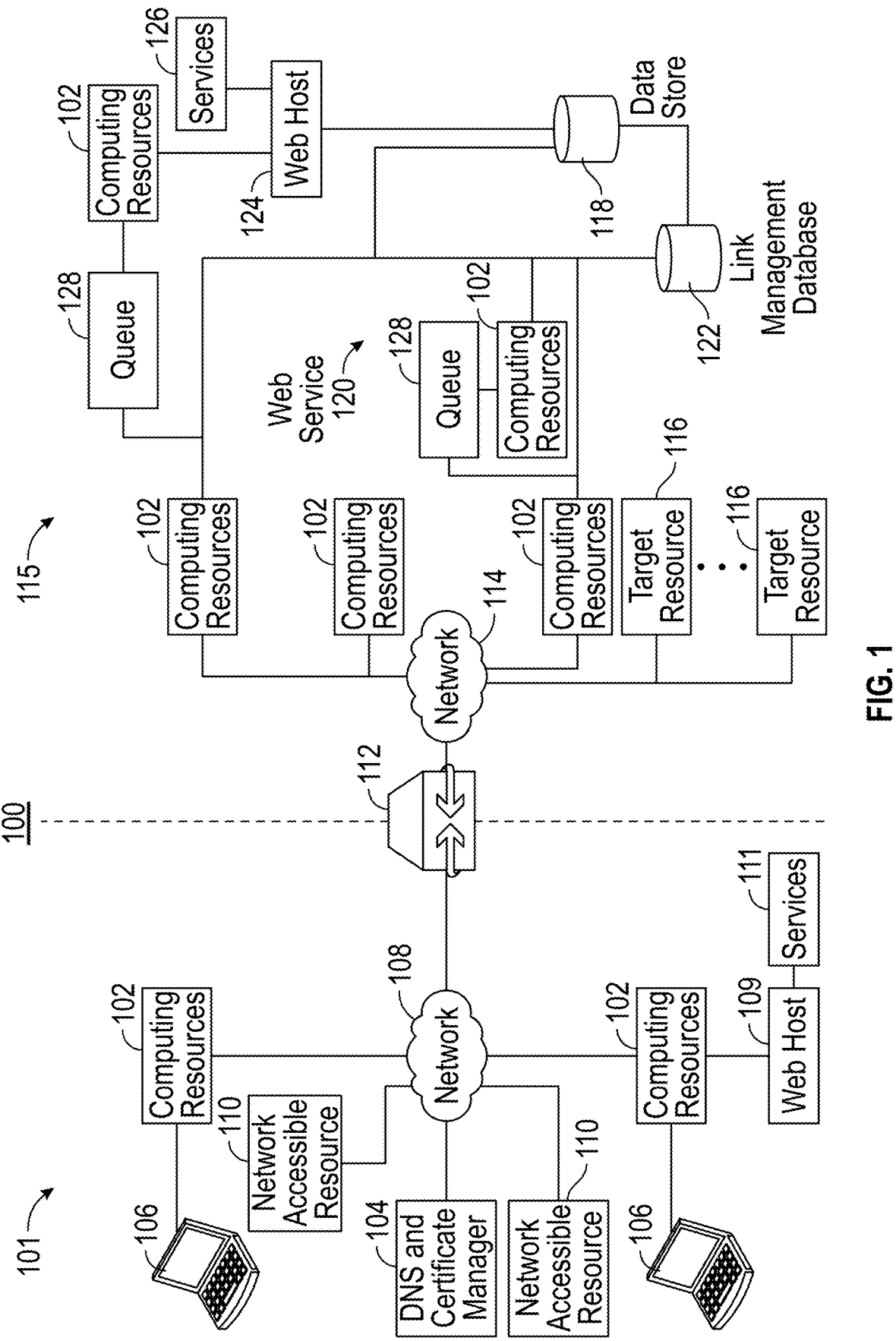
FIG. 1 depicts a block diagram of a system according to some embodiments of the present invention.

Turning now to FIG. 1, a system 100 is depicted upon which a self-diagnosing link stabilizer may be implemented. The system 100 can include computing resources 102 accessible by a user system 106. The computing resources 102 can be on a server or available through a cloud service in a serverless architecture, for instance, using application programming interface (API) calls. API calls can include REST HTTP API calls, which may use JSON payloads. The computing resources 102 can include, for example, a plurality of memory resources and a plurality of processor resources configured to access the memory resources and execute a plurality of instructions to perform a plurality of operations. Memory resources can include a memory device, also referred to herein as "computer-readable memory" (e.g., non-transitory memory devices as opposed to transmission devices or media), and may generally store program instructions, code, and/or modules that, when executed by a processing device/resource, cause a particular machine to function in accordance with one or more embodiments described herein. The memory resources and processor resources can be scalable to match the computing demand of the user system 106. The user systems 106 may each be implemented using a computer executing one or more computer programs for carrying out processes described herein. In one embodiment, the user systems 106 may each be a personal computer (e.g., a laptop, desktop, etc.), a network server-attached terminal (e.g., a thin client operating within a network), or a portable device (e.g., a tablet computer, personal digital assistant, smart phone, etc.).

To reach network accessible resources 110 through a network 108, the computing resources 102 and a domain name server (DNS) and certificate manager 104 can be used for mapping domain names to network addresses and maintaining secure communication paths. In some aspects, the network accessible resources 110 can include links to other content located elsewhere, such as one or more target resources 116 that may reside on another network, such as network 114. A gateway 112 may exist between a first network zone 101 that includes network 108 and a second network zone 115 that includes network 114. The gateway 112 can perform protocol-specific communication routing, for instance, between networking technologies and/or addressing of the first network zone 101 and the second network zone 115. Rather than embedding a URL link that directly identifies the location of the target resources 116 within the network accessible resources 110, embodiments can embed one or more alias links within the network accessible resources 110. The alias links can be resolved through a web service 120 that stores mapping information, for instance, in a link management database 122. For example, an alias link in one of the network accessible resources 110 can be resolved through web service 120 by linking to a data item in the link management database 122 which defines the location of the target resource 116. A user application or web browser can then be redirected to the current address of the target resource 116.

In embodiments, one or more of the user systems 106 can configure aspects of the web service 120 to set up alias link mapping and insert alias links into network accessible resources 110. For example, a web host 109 can be accessible through computing resources 102 of the first network zone 101 to execute services 111 and/or a web host 124 can be accessible through the second network zone 115 to execute services 126. In some aspects, the services 111, 126 can be distributed, where portions of the services 111 interact with services 126. The services 111, 126 can provide configuration and health checks related to alias links, while the web service 120 may be used to access content through alias links. The web service 120 can be distributed between multiple computing resources 102. Some computing resources 102 can use queues 128 to manage communication and data flows between network components. For example, to manage data transfer to/from web host 124, a queue 128 may be implemented between computing resources 102 of the second network zone 115. Data accessible through the web host 124 can be stored in a data store 118. The data store 118 can also be associated with content stored in the link management database 122. Some computing resources 102 of the web service 120 may directly access the link management database 122, while other computing resources 102 may use a queue 128 to manage the network traffic as multiple requests for alias link resolution may be received with a high volume at about the same time.

As an example, one of the services 111, 126 can include an automated service that monitors all generated aliases to ensure that the unique online artifact specified by an HTTP URL returns a healthy response code (e.g., 200-OK) when requested. If a redirect response code is returned (e.g., 301-REDIRECT, 302-REDIRECT) the health check can follow the redirect to ensure that a healthy response code is returned. Alias creators and group maintainers can be notified and alerted when health conditions are detected, such as multiple consecutive non-healthy response codes (e.g., 400-499 CLIENT ERROR, 500-599 SERVER ERROR) are returned or other errors are detected, so that a valid HTTP URL can be specified for the alias link. Further, an alias link may point to a protected HTTP URL that requires authentication for access. The health-check service can be configured with credentials to allow outgoing HTTP HEAD requests to validate that protected HTTP URLs are healthy.

Although the example of FIG. 1 depicts one configuration of system 100, it will be understood that many other configurations are contemplated. For instance, there can be a greater or lesser number of system elements beyond those depicted in the example of FIG. 1. Further, there can be many subnetworks with target resources distributed across multiple networks or subnetworks. Further details and examples regarding alias link management are described in greater detail herein.

Figure 2:
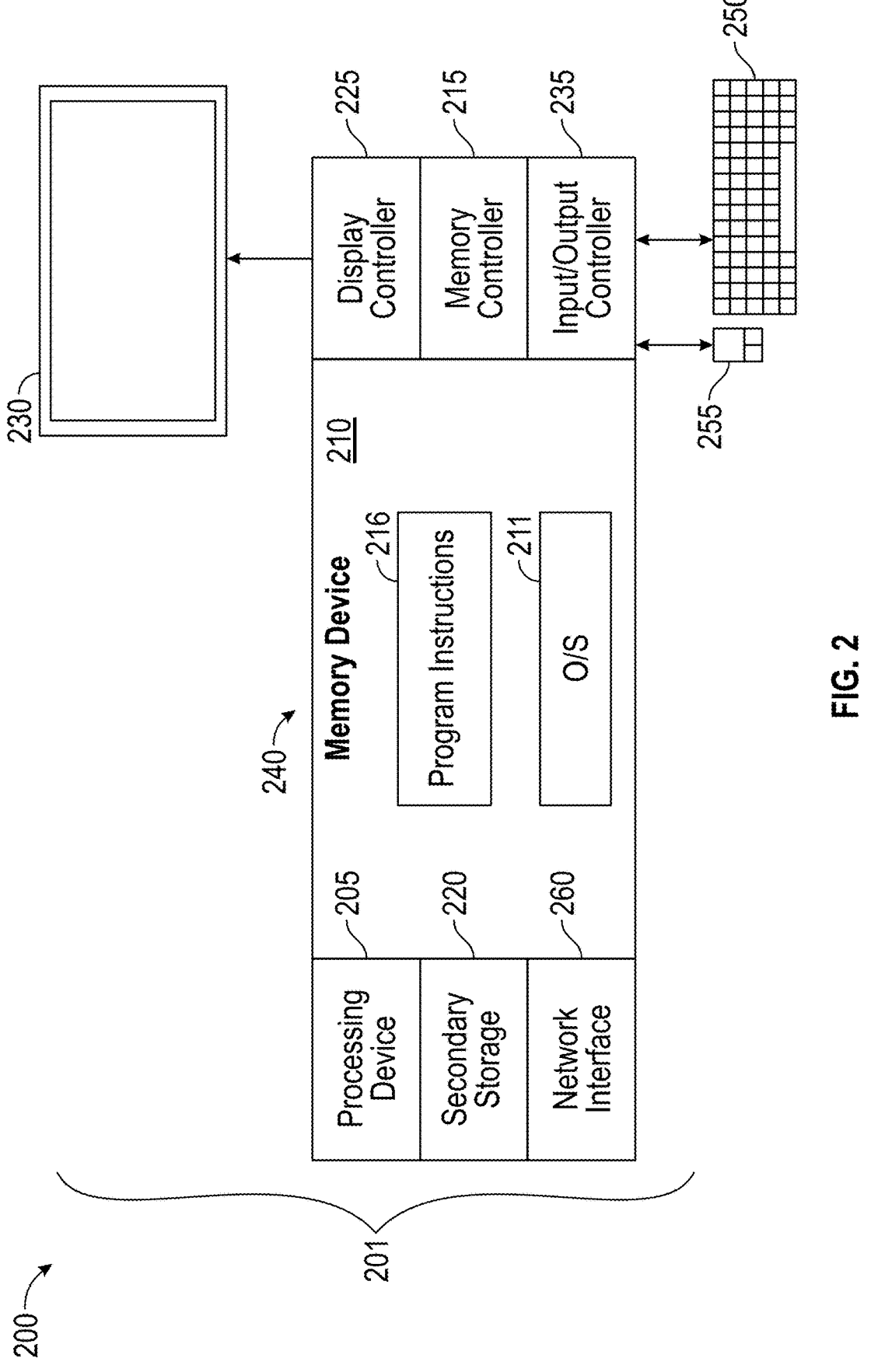
FIG. 2 depicts a block diagram of a system according to some embodiments of the present invention.

FIG. 2 depicts a block diagram of a system 200 according to an embodiment. The system 200 is depicted embodied in a computer 201 in FIG. 2. The system 200 is an example of one of the user systems 106 and/or a portion of computing resources 102 of FIG. 1.

In an exemplary embodiment, in terms of hardware architecture, as shown in FIG. 2, the computer 201 includes a processing device 205 and a memory device 210 coupled to a memory controller 215 and an input/output controller 235. The input/output controller 235 may comprise, for example, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion-sensitive interface (not depicted). The computer 201 can further include a display controller 225 coupled to a display 230.

The processing device 205 comprises a hardware device for executing software, particularly software stored in secondary storage 220 or memory device 210. The processing device 205 may comprise any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disk read only memory (CD-ROM), flash drive, disk, hard disk drive, diskette, cartridge, cassette or the like, etc.). Moreover, the memory device 210 may incorporate electronic, magnetic, optical, and/or other types of storage media. Accordingly, the memory device 210 is an example of a tangible computer readable storage medium upon which instructions executable by the processing device 205 may be embodied as a computer program product. The memory device 210 can have a distributed architecture, where various components are situated remotely from one another, but can be accessed by one or more instances of the processing device 205.

The instructions in memory device 210 may include one or more separate programs, each of which comprises an ordered listing of executable instructions for implementing logical functions. In the example of FIG. 2, the instructions in the memory device 210 include a suitable operating system (O/S) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the web service 120 and/or services 111, 126 of FIG. 1.

The computer 201 of FIG. 2 also includes a network interface 260 that can establish communication channels with one or more other computer systems via one or more network links. The network interface 260 can support wired and/or wireless communication protocols known in the art. For example, when embodied in one of the user systems 106, the network interface 260 can establish communication channels with at least one of the computing resources 102 of the first network zone 101 and/or the second network zone 115.

FIG. 3 depicts an example of link aliasing 300 for embedded link management according to some embodiments. In the example of FIG. 3, one or more of the network accessible resources 110 can include alias links 302 rather than directly embedding links to a target resource, which may initially be located at a first target address 304 (e.g., at example.com). An alias link manager 306 can provide access to the web service 120 of FIG. 1 to manage the relationship mapping the alias links 302. If the target resource is moved to another location at a second target address 308 (e.g., at change.com), the new mapping only needs to be updated through alias link manager 306 rather than changing each instance of alias links 302 in multiple network accessible resources 110. The alias link manager 306 manages the mapping redirection such that the nickname of alias links 302 is automatically redirected to change.com in this example.

In a typical system, changes to an HTTP URL for a specific online artifact are not automatically propagated to links embedded in documents, software, and/or systems. All embedded links must be individually and manually updated to utilize the new HTTP URL. The shortcoming is effectively a problem of tracking, maintenance, and scale. It is difficult and time-consuming to inventory and track documents, software, and/or systems as they are copied and modified throughout an enterprise system. It is also difficult to verify and validate that every existing document, software, and/or system that utilized an old HTTP URL has been updated with the new HTTP URL. Through the alias link manager 306, a self-diagnosing link stabilizer is provided that can rapidly update targets of alias links that are separately defined, rather than embedded within documents, software, and/or systems. Further, an automated process can be used to generate and replace existing links with alias links to convert legacy content. The alias link manager 306 can also identify broken links and notify designated parties to address them before users attempt to access the broken links. For example, the alias link manager 306 can periodically run access tests to the alias links 302 and verify that an error code is not received. If an error code is received, then the alias link manager 306 can send a message to an administrator to initiate an investigation and update. This can occur asynchronously to a user attempting to access the alias links 302. Further, if upon a user attempting to access the alias links 302, a broken link is discovered, the alias link manager 306 can automatically send a message to an administrator at that time, rather than forcing the user to figure out whom to contact about the issue.

Thus, embodiments provide an infrastructure to mitigate problems of maintenance and scale. Users can create an alias to an HTTP URL for each specific online artifact that they wish to embed as a link in documents, software, and/or systems. The alias link then propagates whenever the document, software, and/or system is copied or updated throughout an enterprise system where it resides. If a user needs to update the alias link to use a new HTTP URL, the alias link only needs to be updated once in a centralized location. All documents, software, and/or systems that link to the alias point to the new HTTP URL due to transitive properties.

Figure 4:
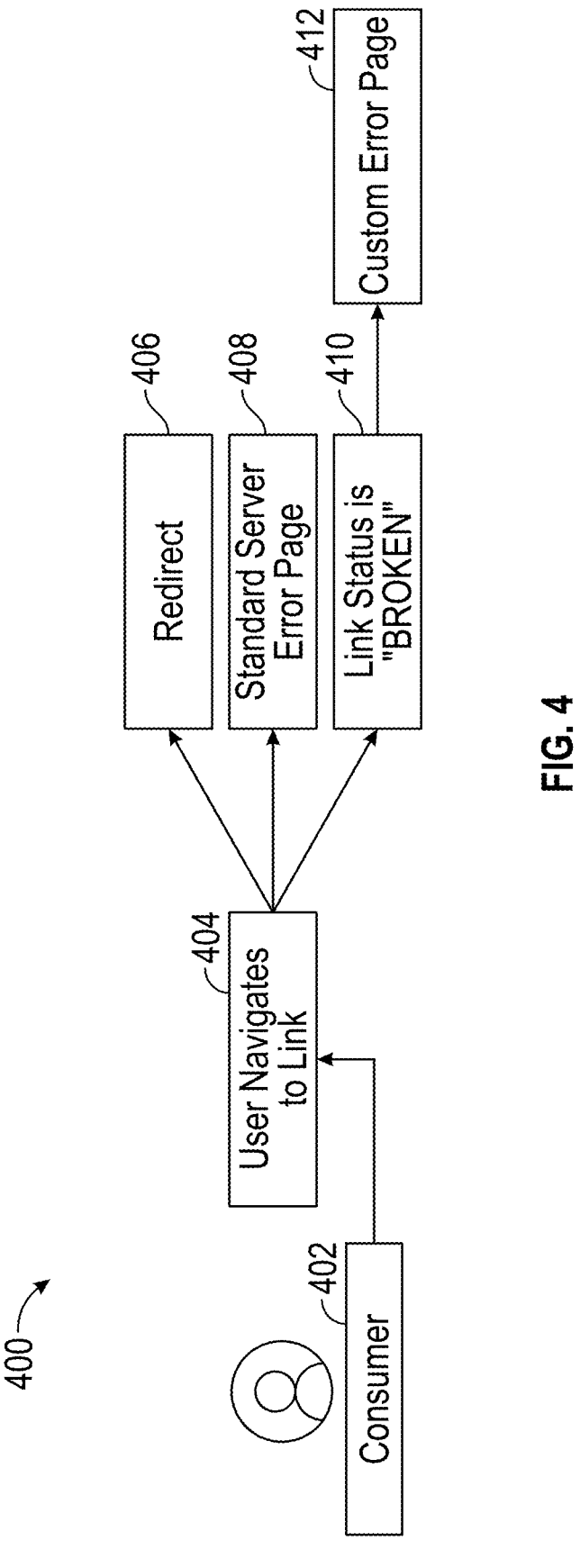
FIG. 4 depicts an example of a consumer process flow according to some embodiments of the present invention.

FIG. 4 depicts an example of a consumer process flow 400 according to some embodiments. In the example of FIG. 4, a consumer 402 can access one of the user systems 106 of FIG. 1 and computing resources 102 to navigate to a link at block 404. The consumer 402 is a user of the link, where the link can be published, edited, and/or produced by another user or system. The consumer 402 need not be a purchaser of goods and/or services. The link can be embedded within one of the network accessible resources 110 of FIG. 1, for example. For instance, the link can be one of the alias links 302 of FIG. 3. The web service 120 of FIG. 1 can perform a redirect 406 to replace the link with a currently mapped address of a target resource. If there is an error in accessing the target resource, a standard server error page 408 may be displayed on a user interface of the user system 106. If the address associated with the target resource is broken, such as the link not pointing to any valid address at block 410, a custom error page 412 can be displayed. The custom error page 412 can be defined through the link management database 122. Content of the custom error page 412 can be stored in the data store 118. Where authentication is needed, embodiments can utilize create, read, update, and delete (CRUD) actions without needing a username/password through a single sign-on interface, for example. Although one example is depicted in FIG. 4, it will be understood that other steps can be added.

In embodiments, the web service 120 of FIG. 1 can support incoming HTTP GET requests and process them as outgoing HTTP GET requests. Other HTTP verbs (e.g., HTTP POST, HTTP PUT, HTTP HEAD, HTTP OPTIONS, etc.) can enable the web service 120 to provide standard web application features such as creating, updating, deleting, or querying a unique online artifact. The web service 120 can also support HTTP verb transformation such that incoming and outgoing HTTP verbs can differ. For example, an incoming HTTP POST request can be mapped to an outgoing HTTP GET request.

Figure 5:
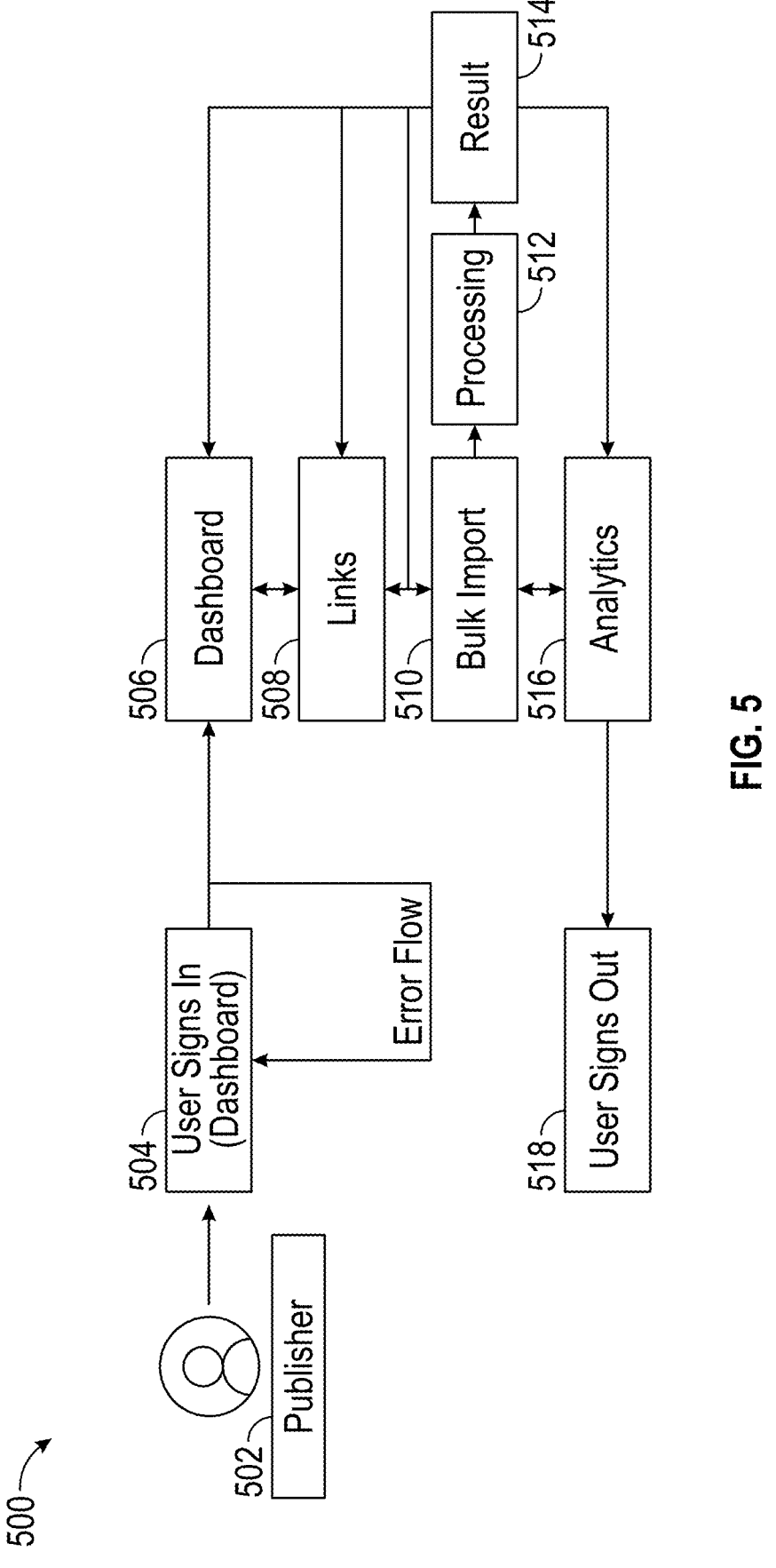
FIG. 5 depicts an example of a producer process flow according to some embodiments of the present invention.

FIG. 5 depicts an example of a producer process flow 500 according to some embodiments. In the example of FIG. 5, a publisher 502 can access one of the user systems 106 of FIG. 1 and computing resources 102 to sign-in to an alias link manager at block 504. The publisher 502 can be a user or system with permissions to create, edit, and/or delete alias links and associated data. The alias link manager may appear as a dashboard 506 with various options for link creation, modification, and analysis. As one example, web host 109 can provide access to link management through the web service 120 and/or services 111. Alternatively, a user system 106 can connect to web host 124 or indirectly access web host 124 and/or services 126 through web host 109 and/or services 111. If an error occurs during processing or upon sign-in, the process can return to block 504, such as a permissions/login error. The dashboard 506 can display default metrics upon sign-in and include options such as link creation and editing at block 508 and bulk importing at block 510. Bulk importing can generate a group of alias links by processing input text or a file at block 512 and producing a result as a list of alias links that map to targets defined in the input at block 514. Options for analytics can be provided at block 516 to filter or refine metrics displayed through the dashboard 506 and/or other custom metrics. The publisher 502 can also configure user permissions to limit access to linked content. For instance, user permissions may need to be authenticated for confidential or protected links, while public links can be generally accessible to a large group of users (e.g., general public). Upon completing updates, the user can sign out at block 518. Although one example is depicted in FIG. 5, it will be understood that many process variations are possible.

In embodiments, the web service 120 of FIG. 1 can configure and enforce authentication and authorization. For example, alias links can be configured such that users inside and outside of an organization can utilize an alias link configured with public access. Users can be forced to authorize with multifactor authentication, for example, before they can access aliases configured with a restricted (internal, private, confidential, etc.) access level. If user permissions and alias access levels match, access is granted to the alias link. If the user cannot authenticate, access is denied to the alias link. If the user permissions do not match the alias access level, access is denied to the alias link.

Figure 6:
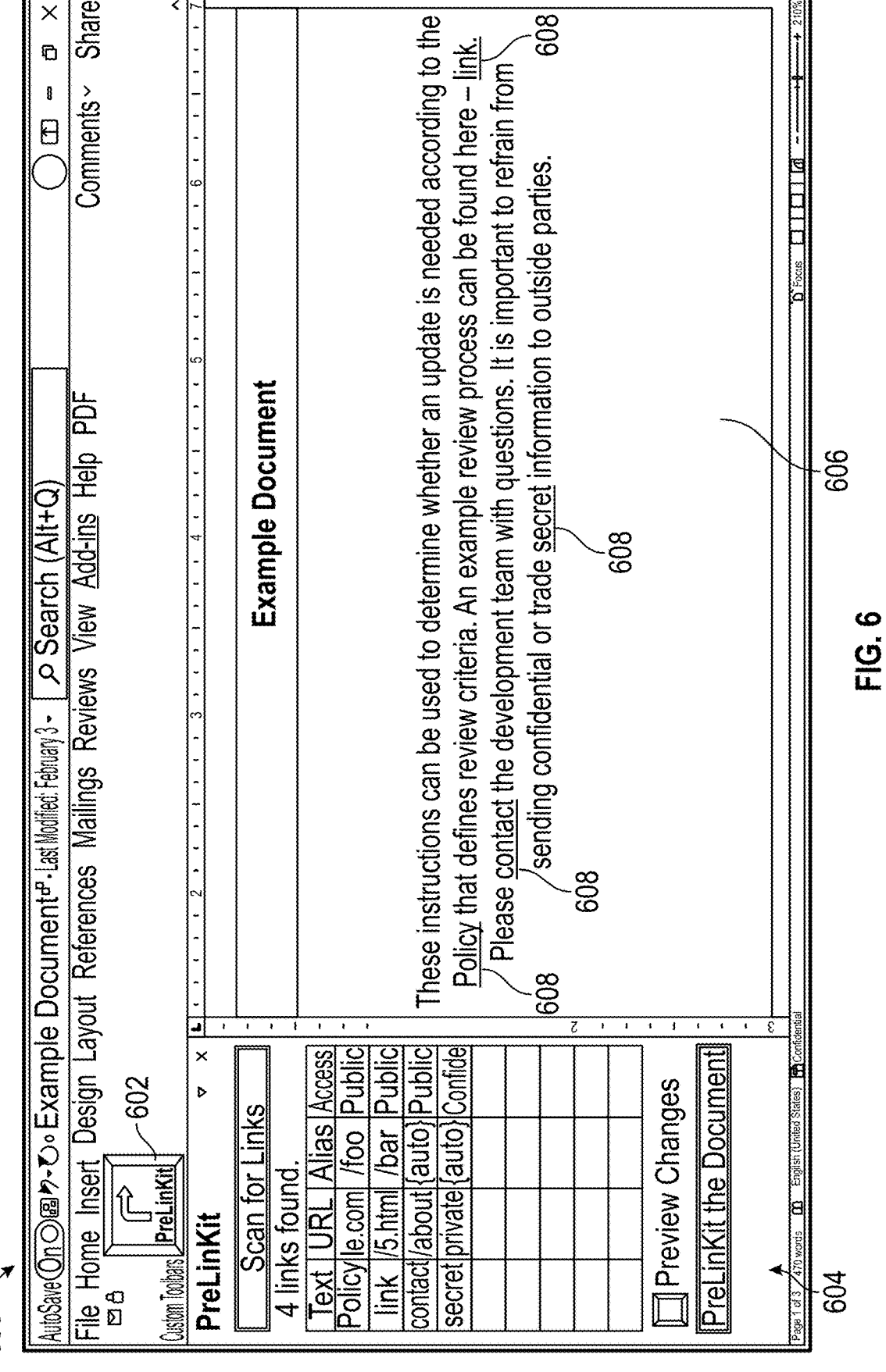
FIG. 6 depicts an example of an application with a link management plug-in according to some embodiments of the present invention.

FIG. 6 depicts an example of an application 600 with a link management plug-in 602 according to some embodiments. The example of FIG. 6 illustrates a word processing application for document generation as the application 600 with the link management plug-in 602. In this example, the link management plug-in 602 is referred to as "PreLinKit" for purposes of illustration. The link management plug-in 602 may provide a link generation panel 604 to perform actions such as scanning content in a document panel 606 of the application 600 for links 608 to be replaced with alias links. As one example, the link generation panel 604 can indicate the text, URL, alias link, and access rules for possible replacement. The link generation panel 604 may also include a preview change option to see how the content of the document panel 606 will appear if the link replacement is performed. Hovering over a link (e.g., using a mouse pointer) in the preview mode can provide a popup preview of the alias link. For instance, hovering over "Policy" in the document panel 606 can result in a popup display indicating an alias link of "/foo" rather than the URL of the location of the policy. The alias link values may be based on alias link generation rules or matches existing in the link management database 122. The link generation panel 604 can support editing of content to allow users to further customize the alias links or select a default option, where automated alias link generation can use naming conventions to automatically generate the alias link name. The user can also remove links from the list where alias links are not desired or only selectively desired. Upon determining that the replacements are acceptable, the process can be completed by selecting a command, such as "PreLinKit the Document" or other such selection. Customizable error pages can also be created when adding or editing alias links. Although one example is depicted in FIG. 6, it will be understood that many variations are possible.

In embodiments, plug-ins, such as link management plug-in 602 can be developed for commercial off-the-shelf (COTS) software, such as word processing applications, such that users can "click to scan" an open document for embedded links and update the documents with aliases. Users can customize options, such as access level (e.g., public, confidential, internal, etc.), alias link (e.g., auto-generate alias, user-provided alias, use existing alias when possible), health check (e.g., perform health check, do not perform health check), and other potential options. A plug-in can submit the options to the web service 120 of FIG. 1 for processing and alias generation. The web service 120 can return generation results back to the plug-in, which then updates the document with the link/alias results that were returned.

Figure 7:
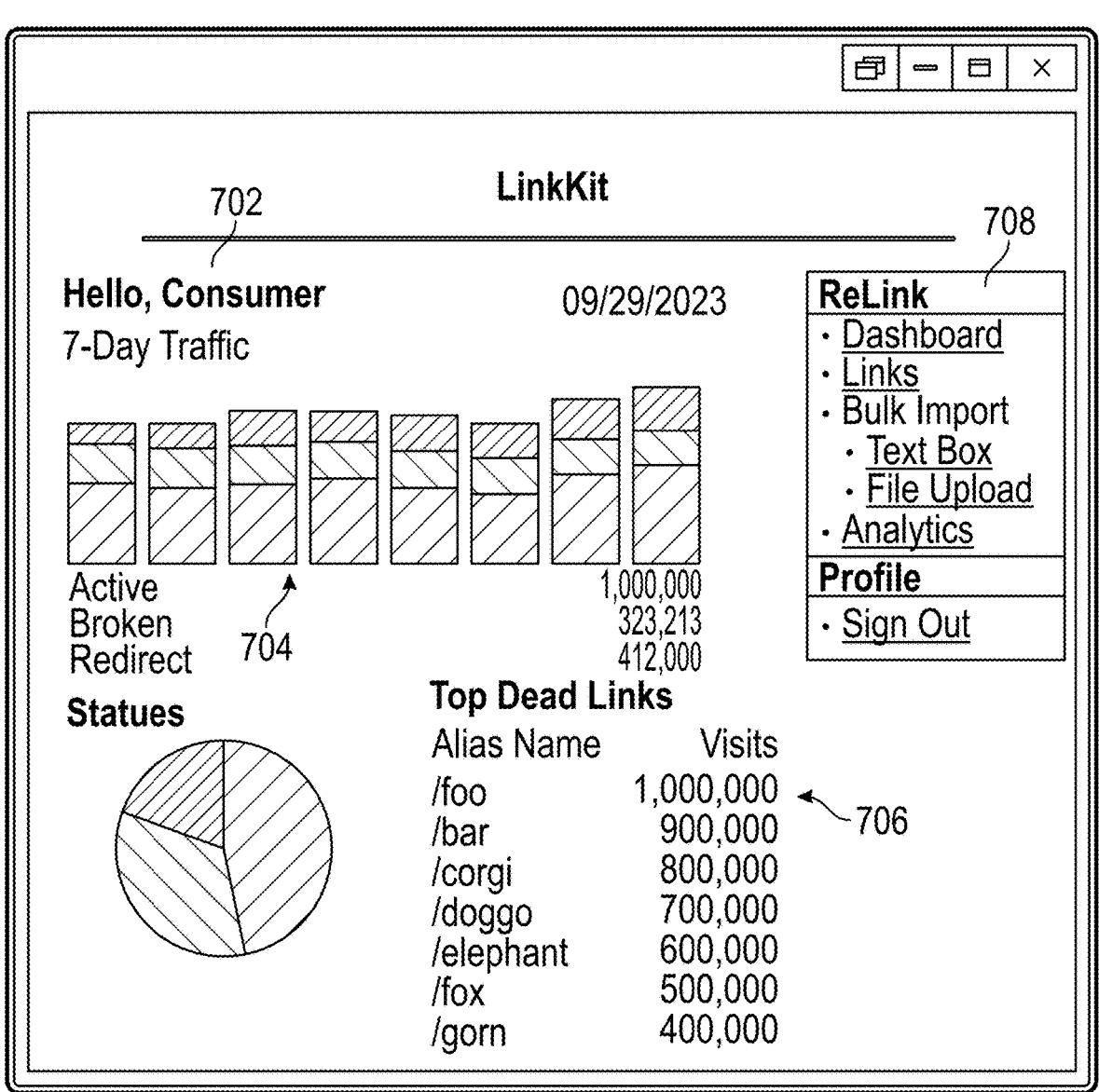
FIG. 7 depicts an example of a link management dashboard according to some embodiments of the present invention.

FIG. 7 depicts an example of a link management dashboard 700 according to some embodiments. In the example of FIG. 7, the link management dashboard 700 can include a user-specific message 702, traffic history 704, status summaries 706, and a menu 708 of options. The traffic history 704 can summarize the performance and use of alias links over a period of time, such as tracking a number of active alias links, broken links, and redirects on a daily, weekly, or monthly basis, for example. The status summary 706 may identify specific alias links with the most traffic over a period of time along with other status information. The traffic history 704 and status summaries 706 can include graphical and/or text based information. The menu 708 can provide access to various tools and services to manage links, perform link imports for bulk alias link generation, and generate customized analytics, for example. Although one example is depicted in FIG. 7, it will be understood that many variations are possible.

Figure 8:
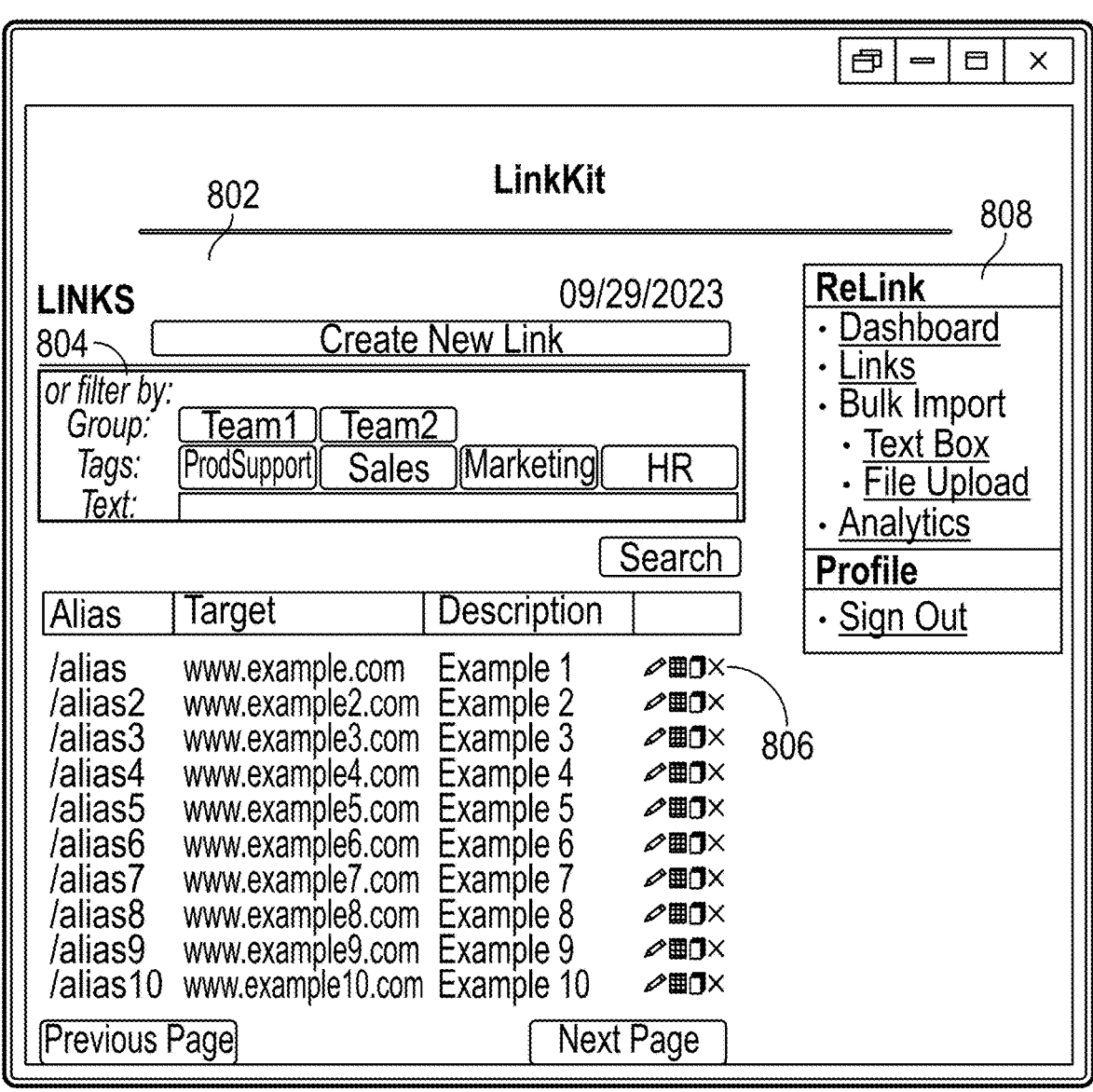
FIG. 8 depicts an example of a link manager according to some embodiments of the present invention.

FIG. 8 depicts an example of a link manager 800 according to some embodiments. In the example of FIG. 8, a link interface 802 is provided to create a new link. The link manager 800 can also include a link filter 804 to view existing alias links that have been created. Filter criteria can include, for instance, groups, tags, and/or text to search for through the existing alias links. If a user attempts to create a new alias link that conflicts with an existing alias link, a warning message may be provided to confirm whether the conflicting links should be combined or another naming variations should be selected. A results list 806 can list the alias links, associated target addresses, descriptions, and further information. The further information can allow for field editing and may track other aspects, such as whether the alias link is time limited, has associated permission constraints, has related groups, and/or may provide history/audit information. Similar to FIG. 7, the link manager 800 can include a menu 808 that provides access to various tools and services to manage links, perform link imports for bulk alias link generation, and generate customized analytics, for example. Although one example is depicted in FIG. 8, it will be understood that many variations are possible.

Figure 9:
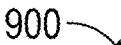
FIG. 9 depicts an example of a link editor according to some embodiments of the present invention.

FIG. 9 depicts an example of a link editor 900 according to some embodiments. The link editor 900 can include various fields 902 that can be filled in or edited in the process of adding or editing an alias link. As an example, fields 902 can include a target, a description, and a customize alias (i.e., alias link) selection. If the customize alias is set to "No", the alias link can be auto-generated, for instance, through an incrementing naming convention (e.g., /alias1, /alias2, etc.). If the customize alias is set to "Yes", an alias entry field 906 may appear to allow customization of the alias link. In some aspects, a suggested alias link may be generated in the alias entry field 906 that can be modified or selected for use. The link editor 900 can also allow selection of attributes from one or more preexisting lists. For instance, preexisting lists 904 can be formatted as "pills" that are selectable for attributes such as group and tags by dragging and dropping desired values or click swapping paired values. Some tags may only be available to certain groups. Administrators can create tags, groups, and associated permissions to control access constraints. There can be multiple combinations of groups and tags defined depending on organizational definitions. In some embodiments, a publisher 502 of FIG. 5 with administrative privileges can add or edit groups and/or tags beyond the available values in preexisting lists 904. Other features associated with alias link generation can also be included in embodiments. Although one example is depicted in FIG. 9, it will be understood that many variations are possible.

Figure 10:
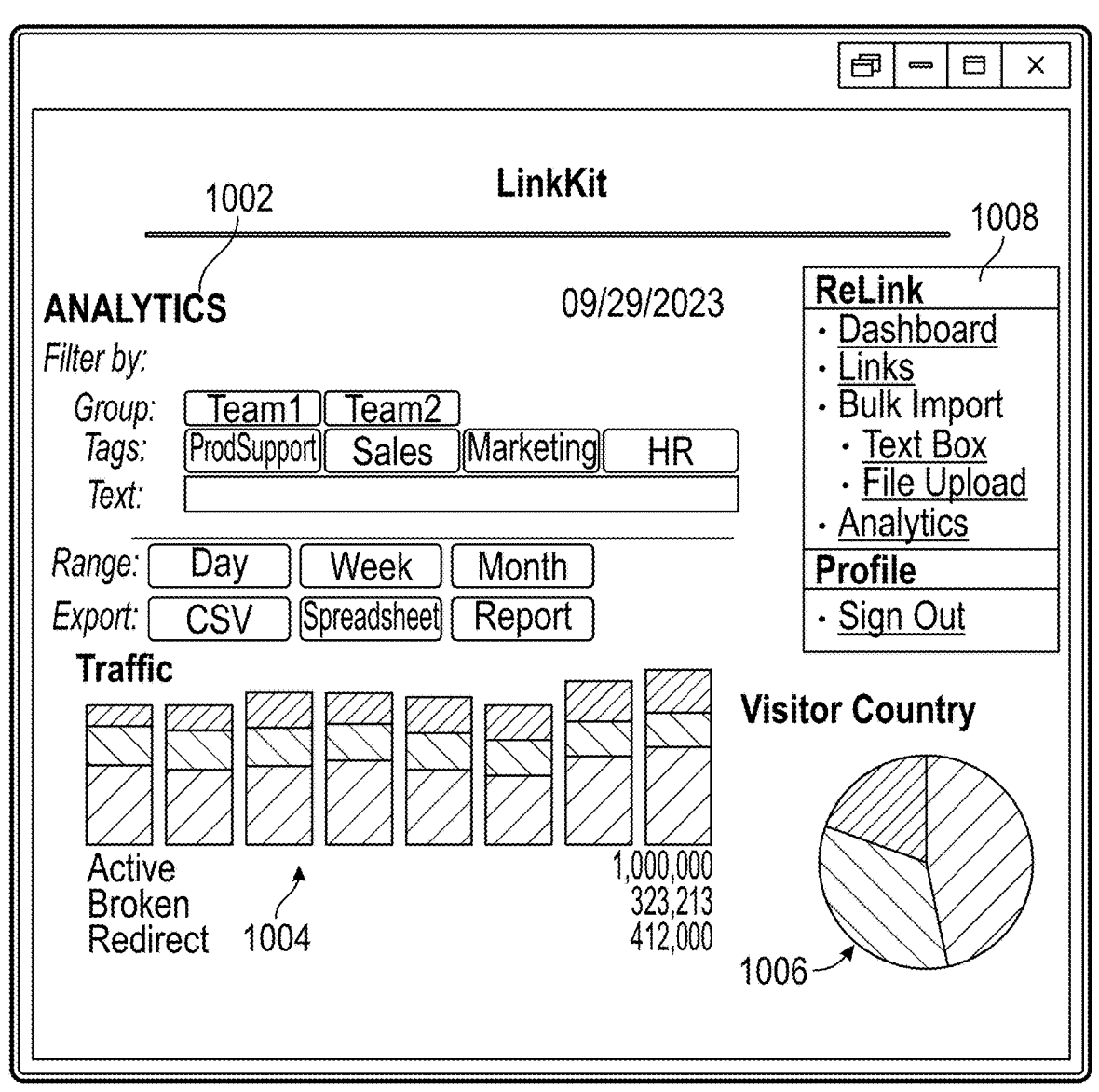
FIG. 10 depicts an example of a link management analytics interface according to some embodiments of the present invention.

FIG. 10 depicts an example of a link management analytics interface 1000 according to some embodiments. The link management analytics interface 1000 can include an analytics filter 1002 to select features for analytics generation, such as group, tags, text, and date ranges, for example. For instance, selecting a date range of day, week, month, or year can result in changing the content of a traffic history 1004 and status summaries 1006 to align with the selected date range. The status summaries 1006 may extend beyond the metrics tracked by the dashboard 700 of FIG. 7. The traffic history 1004 and status summaries 1006 can include graphical and/or text based information that may summarize metadata about network traffic and link health of alias links for a period of time. A menu 1008 can provide access to various tools and services to manage links, perform link imports for bulk alias link generation, and generate customized analytics, for example. Although one example is depicted in FIG. 10, it will be understood that many variations are possible.

Examples of analytics can include, for instance, a bar chart that shows traffic patterns for a date range including a total count of active (healthy) links, broken (unhealthy) links and redirect links (e.g., status code of 30 rather than 20). Status examples can include top dead links, visitor country pie chart/table, visitor browsers pie chart/table, and other such graphical and text information. Data and/or graphics can be exported from the link management analytics interface 1000, for instance, as a comma-separated value file, a spreadsheet, a document, and/or other format. Exporting can be performed through a file system or an API, for example.

Figure 11:
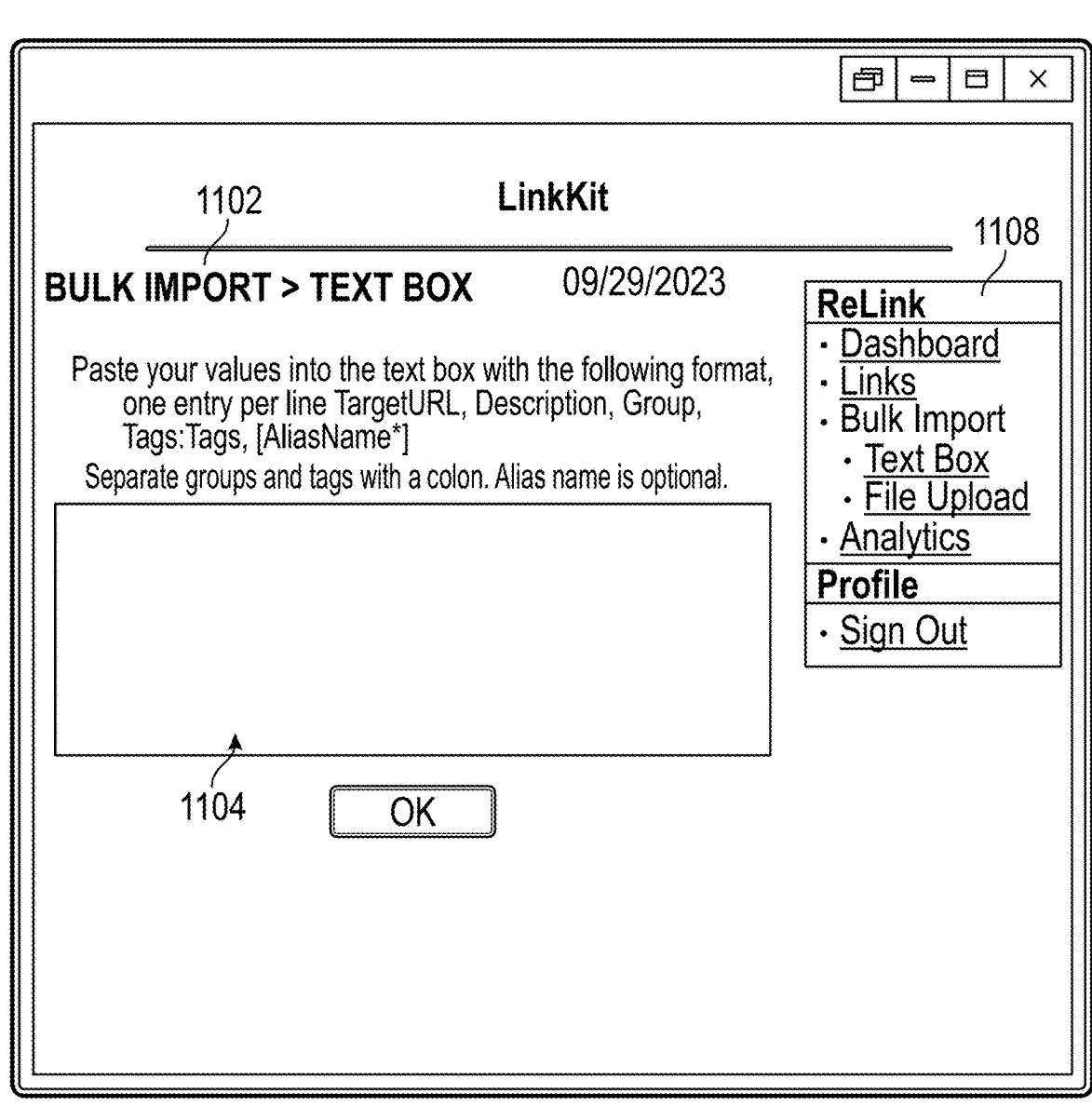
FIG. 11 depicts an example of a bulk import text box interface according to some embodiments of the present invention.

FIG. 11 depicts an example of a bulk import text box interface 1100 according to some embodiments. In the example of FIG. 11, an instruction region 1102 can include usage instructions regarding syntax for text entry in a text box 1104 for bulk import of links to generate alias links. Upon entry of content into the text box 1104 and selecting an "OK" button, the text can be parsed to determine whether the syntax is valid. If the syntax is invalid, an error message can be generated. If the syntax is valid, the bulk import can proceed and a success status message can be output. The success status can identify which alias links were created and if any errors were encountered, such as a naming error or database error. A menu 1108 can provide access to various tools and services to manage links, perform link imports for bulk alias link generation, and generate customized analytics, for example. Although one example is depicted in FIG. 11, it will be understood that many variations are possible.

10

Figure 12:
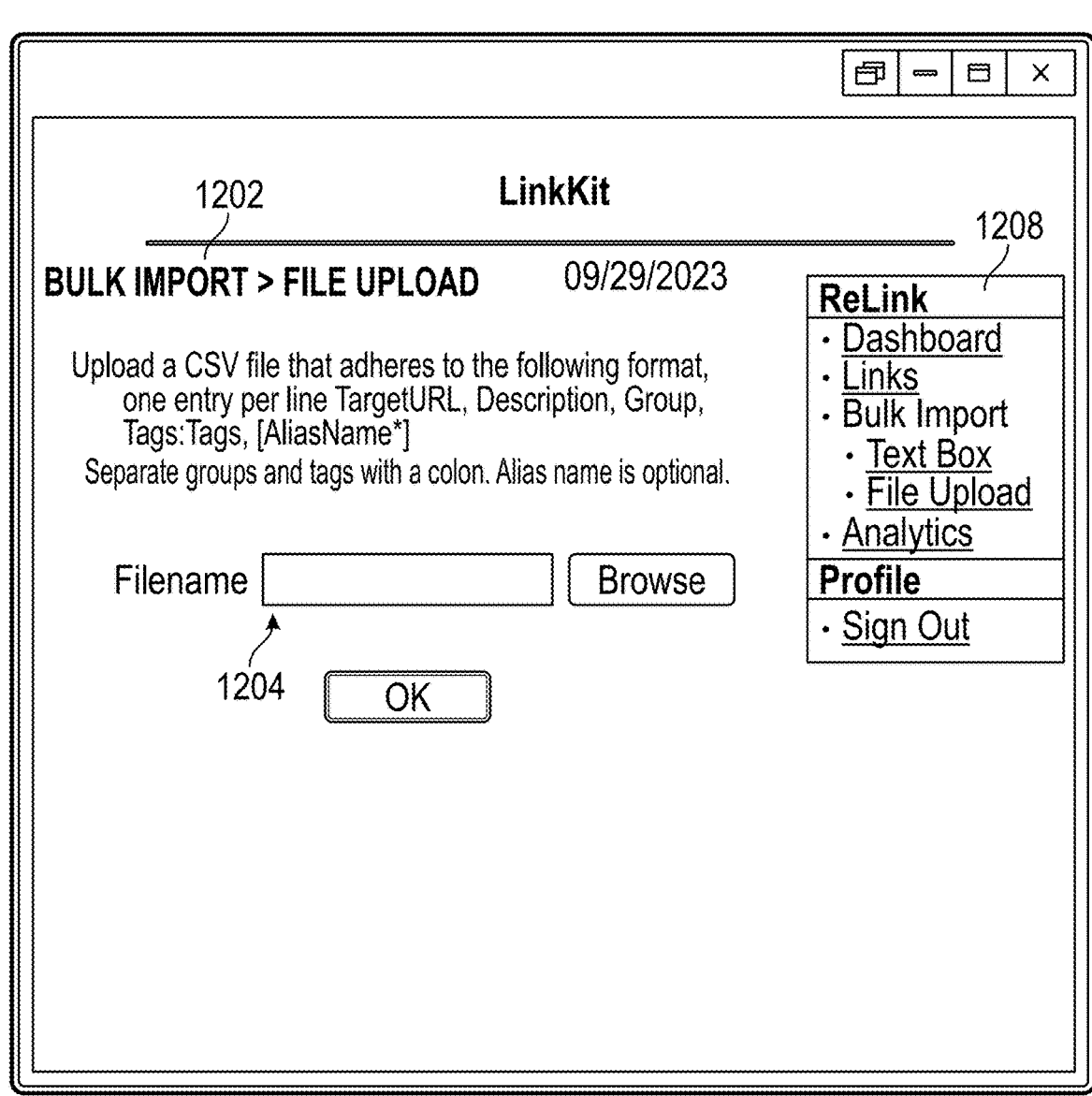
FIG. 12 depicts an example of a bulk import file upload interface according to some embodiments of the present invention.

FIG. 12 depicts an example of a bulk import file upload interface 1200 according to some embodiments. In the example of FIG. 12, an instruction region 1202 can include usage instructions regarding syntax for a file identified in a filename box 1204 for bulk import of links to generate alias links. Upon entry of content into the filename box 1204 through browsing or direct entry and selecting an "OK" button, the text of the file can be parsed to determine whether the syntax is valid. If the syntax is invalid, an error message can be generated. If the syntax is valid, the bulk import can proceed and a success status message can be output. The success status can identify which alias links were created and if any errors were encountered, such as a naming error or database error. A menu 1208 can provide access to various tools and services to manage links, perform link imports for bulk alias link generation, and generate customized analytics, for example. Although one example is depicted in FIG. 12, it will be understood that many variations are possible. Further, imports can be performed through an API and/or plug-in 602 of FIG. 6, for example.

Turning now to FIG. 13, a process flow 1300 of an alias link management process is depicted according to an embodiment. The process flow 1300 includes a number of steps that may be performed in the depicted sequence or in an alternate sequence. The process flow 1300 may be performed by the system 100 of FIG. 1. The process flow 1300 is described in reference to FIGS. 1-13.

At step 1302, an alias link can be generated through a web service 120, the alias link defining a first target link to a first target resource through a network.

At step 1304, the alias link can be inserted within a network accessible resource 110. The network accessible resource 110 that includes the alias link can include, for example, one or more of: a document, an application, a web page, and a hypertext transfer protocol enabled device.

At step 1306, access to the first target resource can be provided through the alias link from within the network accessible resource 110. At block 1308, the alias link can be maintained in an unchanged state after the web service 120 changes the alias link to define a second target link to a second target resource through the network.

In some embodiments, the web service 120 can provide access to perform one or more operations to the alias link, including one or more of: creating, reading, updating, deleting, maintaining, monitoring, and publishing the alias link. Further, the web service 120 can be configured to receive an incoming request with an associated action through the alias link, generate a request directed to the first target resource including the associated action, and pass a response from the first target resource back to the network accessible resource. The web service 120 can receive an incoming request with an associated action through the alias link, determine a modification to the associated action, generate a request directed to the first target resource including the modification to the associated action, and pass a response from the first target resource back to the network accessible resource. The web service 120 can receive an incoming request with a user identifier through the alias link, deny access to the alias link based on determining that a user associated with the user identifier failed an authentication, deny access to the alias link based on determining that the user associated with the user identifier has user permissions that do not match an alias access level, and grant access to the alias link based on determining that the user associated with the user identifier has user permissions that match the alias access level.

In some embodiments, the system 100 can include a user interface that allows users to select a domain name to generate the alias link. The user interface can provide a plurality of suggested domain names for selection through the user interface.

In some embodiments, a plug-in can be configured to interact with the network accessible resource and manage interactions with the web service 120. The plug-in can be an add-on component to an editing application configured to edit the network accessible resource 110.

In embodiments, the web service 120 can include a single sign-on interface that supports authentication passing of previously entered credentials. Further, an error page editor can provide a customization interface to select error handling rules on an alias link basis. The system 100 can also include a link manager that includes a link editor with an alias link search interface, a link history, a link analytics interface, a bulk import interface, and a dashboard interface.

The system 100 can include computing resources that include memory resources and processor resources. The processor resources and/or memory resources can be cloud computing resources in a serverless architecture.

Turning now to FIG. 14, a process flow 1400 of an alias health check process is depicted according to an embodiment. The process flow 1400 includes a number of steps that may be performed in the depicted sequence or in an alternate sequence. The process flow 1400 may be performed by the system 100 of FIG. 1. The process flow 1400 is described in reference to FIGS. 1-14.

At step 1402, an alias health check service (e.g., one of services 111, 126) can monitor a plurality of aliases to determine whether each associated target resource returns a response code that matches an expected code in response to a request. At step 1404, based on determining that a redirect response code is returned as the response code, the alias health check service can perform a health check to follow the redirect and determine whether the expected code is returned. At step 1406, the alias health check service can send a notification to one or more creators and group maintainers based on detecting one or more health conditions in response to the health check to prompt an update of an associated alias link. As an example, multiple non-healthy response codes can be detected and compared to a threshold to trigger the notification. This can help to avoid false positives for intermittent failure conditions. For instance, a temporary network issue may appear as a failed health check that is restored upon resolution of the network issue. Thus, as one example, an up/down health counter can be used to identify a failure condition, such that a failure counter that increments on failures may decrement back toward zero if the health issue is resolved before reaching a threshold level used to trigger the notification. The alias health check service can use credentials to allow outgoing requests to validate that one or more authentication-protected alias links are healthy.

Turning now to FIG. 15, a process flow 1500 of an alias link insertion process is depicted according to an embodiment. The process flow 1500 includes a number of steps that may be performed in the depicted sequence or in an alternate sequence. The process flow 1500 may be performed by the system 100 of FIG. 1. The process flow 1500 is described in reference to FIGS. 1-15.

At step 1502, an alias link insertion service (e.g., one of services 111, 126) can search one or more files for one or more links to one or more target resources through the network. At step 1504, the alias link insertion service can generate one or more alias links associated with the one or more target resources. At step 1506, the alias link insertion service can replace the one or more links with the one or more alias links. Alias link insertion can leave the visible portion of text within a file unchanged, while updating link metadata that may not be directly visible to a user viewing the contents of the file.

Turning now to FIG. 16, a process flow 1600 of an alias link insertion process is depicted according to an embodiment. The process flow 1600 includes a number of steps that may be performed in the depicted sequence or in an alternate sequence. The process flow 1600 may be performed by the system 100 of FIG. 1. The process flow 1600 is described in reference to FIGS. 1-16.

At step 1602, a batch processing interface can generate a list of network accessible resources that include the one or more links based on searching the one or more files. At step 1604, the batch processing interface can provide the list to a user interface. At step 1606, the batch processing interface can customize one or more aspects of the one or more alias links prior to generation of the one or more alias links based on input received through the user interface associated with the list.

In some aspects, batch processing can be used as part of a migration process as content that is the target of one or more links is moved, such as within an intranet environment, where other content within the intranet environment can be searched and updated through automated processes. This approach can rapidly locate embedded links that may not function after movement of content targeted by the links. Rather than updating links multiple times after targeted content moves to another location, a single pass of updates can be performed to replace existing direct links with alias links. When content targeted by the alias links is moved, the new location information can be updated in a single location (e.g., link management database 122 of FIG. 1) rather than searching across one or more network locations (e.g., folders) for potentially broken links resulting from the new location of the targeted content. Thus, network performance can be improved by avoiding additional search and replace operations, and processing system resource consumption can be reduced by avoiding multiple file updates and associated operations.

Technical effects include efficient use of network resources by using alias links to embed links across multiple network accessible resources such that a mapping definition of an alias link can be updated at a single controlled location without search through multiple documents, software, and/or systems to determine where changed/broken links may exist. Bulk alias link generation can automate alias link creation and underlying resource modification. Health checks can seek link status to proactively identify potentially broken links before a user attempts to use a broken link. A reporting process can automate reporting of broken links such that a user of the broken link need not take additional steps to identify a link owner and manually report the broken link.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In one aspect, the computer readable storage medium may comprise a tangible medium containing or storing a program for use by or in connection with an instruction execution system, apparatus, and/or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may comprise any computer readable medium that is not a computer readable storage medium and that can communicate, propagate, and/ or transport a program for use by or in connection with an instruction execution system, apparatus, and/or device.

The computer readable medium may contain program code embodied thereon, which may be transmitted using any appropriate medium, including, but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server.

It will be appreciated that aspects of the present invention are described herein with reference to flowchart illustrations and/or block diagrams of methods, apparatus (systems) and computer program products, according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:

a plurality of memory resources; and a plurality of processor resources configured to access the memory resources and execute a plurality of instructions to perform a plurality of operations that:

generate an alias link through a web service, the alias link defining a first target link to a first target resource through a network;

replace a link to the first target resource within a network accessible resource with the alias link, wherein the network accessible resource comprises a file accessible through the network;

provide access to the first target resource through the alias link from within the network accessible resource using the web service to resolve the alias link responsive to selection of the alias link from within the network accessible resource, wherein the web service maps redirection to the first target resource using a link management database that defines a single network location of the first target resource;

maintain the alias link in an unchanged state after the web service changes the alias link to define a second target link to a second target resource through the network;

monitor a plurality of aliases to determine whether each associated target resource returns a response code that matches an expected code according to a hypertext transfer protocol in response to a request according to the hypertext transfer protocol;

based on determining that a redirect response code is returned as the response code according to the hypertext transfer protocol, perform a health check to follow a redirect associated with returning of the redirect response code, and determine whether the expected code is returned according to the hypertext transfer protocol; and send a notification to one or more creators and group maintainers based on detecting one or more health conditions in response to the health check to prompt an update of an associated alias link.

2. The system of claim 1, wherein the web service provides access to perform one or more operations to the alias link, comprising one or more of: creating, reading, updating, deleting, maintaining, monitoring, and publishing the alias link.

3. The system of claim 1, wherein the system comprises the web service, and the web service is configured to:

receive an incoming request with an associated action through the alias link;

generate a request directed to the first target resource including the associated action; and pass a response from the first target resource back to the network accessible resource.

4. The system of claim 1, wherein the system comprises the web service, and the web service is configured to:

receive an incoming request with a user identifier through the alias link;

deny access to the alias link based on determining that a user associated with the user identifier failed an authentication;

deny access to the alias link based on determining that the user associated with the user identifier has user permissions that do not match an alias access level; and grant access to the alias link based on determining that the user associated with the user identifier has user permissions that match the alias access level.

5. The system of claim 1, wherein the alias health check service is configured to use credentials to allow outgoing requests to validate that one or more authentication-protected alias links are healthy according to the hypertext transfer protocol.

6. The system of claim 1, further comprising a user interface that allows users to select a domain name to generate the alias link.

7. The system of claim 6, wherein the user interface provides a plurality of suggested domain names for selection through the user interface.

8. The system of claim 1, further comprising a plug-in configured to interact with the network accessible resource and manage interactions with the web service.

9. The system of claim 8, wherein the plug-in is an add-on component to an editing application configured to edit the network accessible resource.

10. The system of claim 1, further comprising an alias link insertion service, the alias link insertion service configured to:

search a plurality of files for one or more links to one or more target resources through the network;

generate one or more alias links associated with the one or more target resources; and replace the one or more links with the one or more alias links.

11. The system of claim 10, further comprising a batch processing interface configured to:

generate a list of network accessible resources that include the one or more links based on searching the plurality of files;

provide the list to a user interface; and customize one or more aspects of the one or more alias links prior to generation of the one or more alias links based on input received through the user interface associated with the list.

12. The system of claim 1, wherein the web service comprises a single sign-on interface that supports authentication passing of previously entered credentials.

13. The system of claim 1, further comprising an error page editor that provides a customization interface to select error handling rules on an alias link basis.

14. The system of claim 1, further comprising a link manager that includes a link editor with an alias link search interface, a link history, a link analytics interface, a bulk import interface, and a dashboard interface.

15. The system of claim 1, wherein the processor resources are cloud computing resources in a serverless architecture.

16. A computer program product comprising one or more non-transitory storage mediums embodied with computer program instructions that when executed by a computer system cause the computer system to implement:

generating an alias link through a web service, the alias link defining a first target link to a first target resource through a network;

replacing a link to the first target resource within a network accessible resource with the alias link, wherein the network accessible resource comprises-one or more files a file accessible through the network;

providing access to the first target resource through the alias link from within the network accessible resource using the web service to resolve the alias link responsive to selection of the alias link from within the network accessible resource, wherein the web service maps redirection to the first target resource using a link management database that defines a single network location of the first target resource;

maintaining the alias link in an unchanged state after the web service changes the alias link to define a second target link to a second target resource through the network monitoring a plurality of aliases to determine whether each associated target resource returns a response code that matches an expected code according to a hypertext transfer protocol in response to a request according to the hypertext transfer protocol;

based on determining that a redirect response code is returned as the response code according to the hypertext transfer protocol, performing a health check to follow a redirect associated with returning of the redirect response code, and determine whether the expected code is returned according to the hypertext transfer protocol; and sending a notification to one or more creators and group maintainers based on detecting one or more health conditions in response to the health check to prompt an update of an associated alias link.

17. The computer program product of claim 16, wherein the web service provides access to perform one or more operations to the alias link, comprising one or more of: creating, reading, updating, deleting, maintaining, monitoring, and publishing the alias link.

18. The computer program product of claim 16, further comprising computer program instructions that when executed by the computer system cause the computer system to implement:

receiving an incoming request with an associated action through the alias link;

generating a request directed to the first target resource including the associated action; and passing a response from the first target resource back to the network accessible resource.

19. The computer program product of claim 16, further comprising computer program instructions that when executed by the computer system cause the computer system to implement:

receiving an incoming request with an associated action through the alias link;

denying access to the alias link based on determining that a user associated with the user identifier failed an authentication or has user permissions that do not match an alias access level; and granting access to the alias link based on determining that the user associated with the user identifier has user permissions that match the alias access level.

20. The computer program product of claim 16, further comprising computer program instructions that when executed by the computer system cause the computer system to implement:

searching a plurality of files for one or more links to one or more target resources through the network;

generating one or more alias links associated with the one or more target resources; and replacing the one or more links with the one or more alias links.

21. The computer program product of claim 20, further comprising computer program instructions that when executed by the computer system cause the computer system to implement:

generating a list of network accessible resources that include the one or more links based on searching the plurality of files;

providing the list to a user interface; and customizing one or more aspects of the one or more alias links prior to generation of the one or more alias links based on input received through the user interface associated with the list.

22. The computer program product of claim 16, wherein the alias link is generated based on input received through a user interface that provides a plurality of suggested domain names and allows users to select a domain name.

23. The computer program product of claim 16, wherein the web service comprises a single sign-on interface that supports authentication passing of previously entered credentials.

* * * * *